United States Patent
Kelley

(10) Patent No.: US 9,478,329 B2
(45) Date of Patent: Oct. 25, 2016

(54) METHODS OF MANUFACTURING WIRE, WIRE PRE-PRODUCTS AND WIRES

(71) Applicant: General Cable Industries, Inc., Highland Heights, KY (US)

(72) Inventor: Frederick J. Kelley, Lexington, MI (US)

(73) Assignee: General Cable Industries, Inc., Highland Heights, KY (US)

( * ) Notice: Subject to any disclaimer, the term of this patent is extended or adjusted under 35 U.S.C. 154(b) by 252 days.

(21) Appl. No.: 14/106,249

(22) Filed: Dec. 13, 2013

(65) Prior Publication Data

US 2014/0099435 A1 Apr. 10, 2014

Related U.S. Application Data

(62) Division of application No. 13/085,929, filed on Apr. 13, 2011, now abandoned.

(51) Int. Cl.
| | |
|---|---|
| H01B 13/14 | (2006.01) |
| B29C 47/88 | (2006.01) |
| B29C 35/04 | (2006.01) |
| B29C 35/06 | (2006.01) |
| B29C 47/00 | (2006.01) |
| B29C 47/02 | (2006.01) |
| B29C 71/00 | (2006.01) |
| B29C 71/02 | (2006.01) |

(52) U.S. Cl.
CPC ............ *H01B 13/145* (2013.01); *H01B 13/14* (2013.01); *B29C 35/04* (2013.01); *B29C 35/041* (2013.01); *B29C 35/06* (2013.01); *B29C 35/065* (2013.01); *B29C 47/0016* (2013.01); *B29C 47/025* (2013.01); *B29C 47/88* (2013.01); *B29C 47/8805* (2013.01); *B29C 47/8895* (2013.01); *B29C 71/0009* (2013.01); *B29C 71/02* (2013.01); *B29C 2035/042* (2013.01); *B29C 2035/043* (2013.01); *B29C 2071/0018* (2013.01)

(58) Field of Classification Search
None
See application file for complete search history.

(56) References Cited

U.S. PATENT DOCUMENTS

| | | | | |
|---|---|---|---|---|
| 2,269,230 | A | * | 1/1942 | Savage .................... H01B 7/28 174/121 AR |
| 2,398,154 | A | * | 4/1946 | Olin ......................... C08J 3/24 192/DIG. 1 |
| 3,198,868 | A | * | 8/1965 | Pedretti ............... B29C 47/0004 264/236 |
| 3,479,446 | A | * | 11/1969 | Arnaudin, Jr. ......... H01B 9/027 156/244.12 |

(Continued)

FOREIGN PATENT DOCUMENTS

| | | |
|---|---|---|
| CN | 1509482 A | 6/2004 |
| CN | 101384376 A | 3/2009 |

(Continued)

OTHER PUBLICATIONS

Cleland R., Marshall et al. "Electron Beam Crosslinking of Wire and Cable Insulation"; p. 1-6.

(Continued)

*Primary Examiner* — Jeffrey Wollschlager
(74) *Attorney, Agent, or Firm* — Ulmer & Berne LLP

(57) ABSTRACT

Exemplary methods for manufacturing a wire and resultant wires are disclosed herein. The method includes extruding a cross-linkable polymer that is substantially free of curing agent about a conductive core, then adding a curing agent to the extruded wire pre-product, then heat-curing the extruded wire pre-product.

12 Claims, 2 Drawing Sheets

(56) References Cited

U.S. PATENT DOCUMENTS

| | | | |
|---|---|---|---|
| 3,532,783 A | 10/1970 | Pusey et al. | |
| 3,645,656 A * | 2/1972 | Stauffer | B29C 35/065 425/113 |
| 3,773,872 A * | 11/1973 | Ishikki et al. | B29C 35/0261 264/442 |
| 3,802,913 A | 4/1974 | MacKenzie, Jr. | |
| 3,911,069 A | 10/1975 | Fujita et al. | |
| 3,959,558 A | 5/1976 | MacKenzie, Jr. | |
| 3,965,224 A | 6/1976 | Freismuth | |
| 3,965,226 A * | 6/1976 | Werwitzke | B29C 47/02 174/120 R |
| 3,974,132 A | 8/1976 | Valdiserri | |
| 4,005,168 A * | 1/1977 | Whitfill, Jr. | H01B 13/14 156/273.9 |
| 4,075,421 A | 2/1978 | McCullough | |
| 4,132,858 A | 1/1979 | Anderson et al. | |
| 4,138,462 A * | 2/1979 | Procida | C08J 7/12 264/209.1 |
| 4,234,531 A | 11/1980 | Jocteur | |
| 4,285,648 A | 8/1981 | Jocteur | |
| 4,457,975 A | 7/1984 | Bahder | |
| 4,469,539 A * | 9/1984 | Wade | H01B 1/24 156/298 |
| 4,554,173 A * | 11/1985 | Fujimura | H01B 3/441 264/171.15 |
| 4,767,894 A * | 8/1988 | Schombourg | H01B 3/44 156/51 |
| 5,128,175 A | 7/1992 | Yamanishi et al. | |
| 5,716,574 A | 2/1998 | Kawasaki | |
| 6,017,626 A * | 1/2000 | Hildreth | H01B 7/292 174/107 |
| 6,359,230 B1 * | 3/2002 | Hildreth | H01B 7/292 174/110 R |
| 7,414,189 B2 | 8/2008 | Griess | |
| 2003/0051900 A1 | 3/2003 | Rodway et al. | |
| 2004/0144471 A1 | 7/2004 | Sikora | |
| 2006/0182880 A1 | 8/2006 | Gitschner | |
| 2006/0246286 A1 * | 11/2006 | Easter | H01B 1/24 428/375 |
| 2007/0221395 A1 * | 9/2007 | Hase | H01B 7/295 174/120 SR |
| 2007/0224886 A1 * | 9/2007 | Rodway | H01B 3/10 439/607.41 |
| 2008/0188589 A1 * | 8/2008 | Sultan | C08L 21/00 523/173 |
| 2009/0131568 A1 * | 5/2009 | Aarts | C08K 3/0058 524/322 |
| 2011/0006453 A1 | 1/2011 | Ying et al. | |

FOREIGN PATENT DOCUMENTS

| | | |
|---|---|---|
| CN | 101817949 A | 9/2010 |
| EP | 0003701 A1 | 8/1979 |
| GB | 1377698 * | 12/1974 |
| JP | 56-11248 A | 2/1981 |
| JP | 9-115367 A | 5/1997 |

OTHER PUBLICATIONS

Brown, Karl, "AMI "Cables 2010"—Coigne; Cost-effective XSLPO Automotive Insulation Compound Used in Thin-wall Applications"; LyondellBasell company; 21 pgs.

ISO 6722; "Road vehicles—60 V and 600 V single-core cables—Dimensions, test methods and requirements" ; Second edition Aug. 1, 2006; 44 pgs.

GMW15626; "Single-Core Stranded ISO Cable" Feb. 2008, p. 1-13.

Wengeler, Heinz; International Search Report and Written Opinion of the International Searching Authority, issued in International Application No. PCT/US2012/032017; dated as mailed on Mar. 24, 2014; 11 pages.

He, Yafan; First Office Action issued in Chinese Patent Application No. 201310648406.6; dated Nov. 3, 2015; 12 pages, including translation.

Gnanasingham, Soosa; Patent Examination Report No. 1 issued in Australian Patent Application No. 2012271224, dated Feb. 5, 2016; 3 pages.

Office Action issued in Chinese Patent Application No. 201280018069.6, dated Jul. 2, 2015; 10 pages, including translation.

Lopez, Viviana Villar; Office Action issued in Chilean Patent Application No. 2931-2013, dated Dec. 14, 2015; 12 pages, including partial translation.

Wang, Na; First Office Action issued in Chinese Patent Application No. 201280018412.7; issued on Oct. 29, 2015; 7 pages, including translation.

Preliminary Rejection issued in Korean Patent Application No. 10-2013-7029987; dated Feb. 24, 2015; 4 pages including partial translation.

Osswald, Tim A.; "Polymer Processing Fundamentals"; Hanser Publishing; 1998; 2 pages.

Hauth, Galen H.; Non-final Office Action issued in U.S. Appl. No. 13/871,507; dated Feb. 13, 2015; 10 pages.

Wengeler, Heinz; International Search Report and Written Opinion of the International Searching Authority issued in International Application No. PCT/US2012/031995; dated as mailed on Nov. 29, 2012; 7 pages.

Office Action issued in Korean Patent Application No. 10-2013-7029985; dated Nov. 26, 2015; 6 pages, including English translation of Grounds for Rejection.

Wada, Zaita; Notification of Reason(s) for Refusal issued in Japanese Patent Application No. 2014-505181; dated Nov. 24, 2015; 8 pages, including English translation.

Wollschlager; Jeffrey Michael; Notice of Allowance and Fee(s) Due issued in U.S. Appl. No. 14/106,343; dated as mailed on Apr. 27, 2016; 11 pages.

Hauth, Galen H.; Non-Final Office Action issued in U.S. Appl. No. 13/871,507; dated as mailed on Sep. 9, 2016; 14 pages.

Wang, Na; Second Office Action issued in Chinese Patent Application No. 201280018412.7; dated Jul. 11, 2016; 8 pages, including English translation.

* cited by examiner

METHODS OF MANUFACTURING WIRE, WIRE PRE-PRODUCTS AND WIRES

This application is a divisional of U.S. patent application Ser. No. 13/085,929, filed Apr. 13, 2011, which is incorporated herein by reference.

TECHNICAL FIELD

The present disclosure refers to exemplary methods for manufacturing wires, as well as to exemplary extruded wire pre-products and exemplary wires.

BACKGROUND

The term "wire" as used herein refers to a conductive core, wherein the conductive core is enveloped by at least one insulative layer. The term "wire" as used herein also encompasses cables, or groups of two or more insulated conductive cores.

Wires have been ubiquitous since at least the Industrial Age for all types of electrical applications. These applications include, without limitation, commercial and residential power supply, appliances, computers and personal electronics of all shapes and sizes, vehicles of all types, including fossil fuel-powered and electrically-powered automobiles and recreational vehicles.

Historically, wires were manufactured by a simple heat-curing method. The historical heat-curing method involved feeding a conductive core into an extruder wherein at least one insulative layer was extruded about the conductive core. To form insulative layers using such methods, all starting materials, including cross-linkable polymers and their associated curing agents, were combined in an extruder prior to extrusion. Then, the starting materials were extruded about the conductive core at temperatures ranging from about 80° C. to about 110° C. depending upon the particular materials. Next, the extruded wire pre-product was heat cured at temperatures ranging from about 135° C. to about 155° C. for a length of time to cause sufficient cross-linking in the insulative layer or layers to confer onto the insulative layer or layers the desired properties, including physical, mechanical and/or electrical properties.

Such historical heat-curing methods were efficient and relatively inexpensive. For example, by adding all of the starting materials to the extruder at roughly the same time, manufacturers may have realized a gain in manufacturing efficiency. That is, manufacturers could avoid slowing manufacturing line speeds and could avoid purchasing additional equipment to manage the addition of separate materials at separate times.

However, historical heat-curing methods faced numerous challenges. For example, manufacturers sought to avoid premature cross-linking during extrusion, also known as scorching. Significant scorching could damage extrusion equipment and generate wire that would not meet technical specifications, including physical, mechanical and/or electrical specifications. Accordingly, manufacturers were left to experiment with polymer and curing agent combinations to minimize scorching.

Eventually, technical demands on wire became more sophisticated, and wire produced by historical heat-curing methods failed to satisfy a variety of technical specifications. This occurred in many industries. By way of non-limiting example, in the automotive industry, certain original equipment manufacturers (OEMs) require wire to withstand scrape abrasion such that when a conductive core of a wire has a cross-sectional area of 0.22 mm$^2$ or less, the insulation on the wire remains intact following 150 cycles of abrasion scrapes with a needle having a diameter of 0.45±0.01 mm. Wire manufactured by historical heat-curing methods does not satisfy this standard.

To meet the growing technical demands on wire, manufacturers increasingly turned away from historical heat-curing methods and toward radiation or electron beam (e-beam) manufacturing methods. Indeed, e-beam manufacturing methods remain in use today.

E-beam manufacturing methods typically involve feeding a conductive core into an extruder where at least one insulative layer is extruded about the conductive core. To form an insulative layer, all starting materials for the layer are added to the extruder. Then, the starting materials are extruded about the conductive core. Next, the extruded wire pre-product is collected on a spool before being exposed to radiation. Radiation initiates curing, so curing agents are not typically used in e-beam manufacturing methods.

E-beam manufacturing methods have advantages over historical heat-curing methods. As non-limiting examples, the cross-linking reaction in e-beam manufacturing methods is faster and more uniform, especially for thin wall wires. The e-beam manufacturing methods produce wire that satisfies more challenging technical specifications. As a non-limiting example, e-beam manufacturing methods are more effective at preparing abrasion-resistant wires and ultra thin wall wires with a temperature class rating of Class D (150° C.) or higher.

E-beam manufacturing methods, however, also involve numerous challenges. The equipment is expensive and there are attendant safety procedures and precautions whenever radiation is used in a manufacturing method. These safety efforts can add to expenses and slow manufacturing line speeds. Additionally, e-beam manufacturing methods may be more difficult to use with thick wall wires. This may be because, at commercially acceptable manufacturing line speeds, there is a potential for incomplete penetration of electron beams through a dense polymeric insulative layer or layers. Incomplete penetration can lead to incomplete curing, which in turn can cause wire to fail technical specifications. For example, the insulation of the wires may swell or crack.

Additionally, using e-beam manufacturing methods to form very flexible wire presents challenges. This may be because, to spool extruded wire that is not yet cured (that is, extruded wire pre-product), the insulative layer or layers must be sufficiently hard to avoid becoming misshapen or deformed. Generally, this requires the extruded wire pre-product to have a hardness of about 80 Shore A or higher. After curing, the cross-linked polymer in the wire causes the wire to be substantially harder than the extruded wire pre-product. As a result, wire made by e-beam manufacturing methods can fail to achieve flexibility-related mechanical properties desired for certain industrial applications. By way of non-limiting example, it may be useful to produce a flexible wire having a tensile stress at yield of less than 9 MPa and a tensile modulus at 200 MPa. Wire produced by e-beam manufacturing methods would not be expected to exhibit such mechanical properties.

Accordingly, there is a need for improved manufacturing methods and wires. Efficient and cost effective methods are desired that can produce wires that meet can meet increasingly demanding technical specifications.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an embodiment. Further, the specific examples described herein are not intended to be exhaustive or otherwise limiting or restricting to the precise form and configuration shown in the drawings and disclosed in the following detailed description. Exemplary illustrations are described in detail by referring to the drawings, as follows:

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Figure 1:
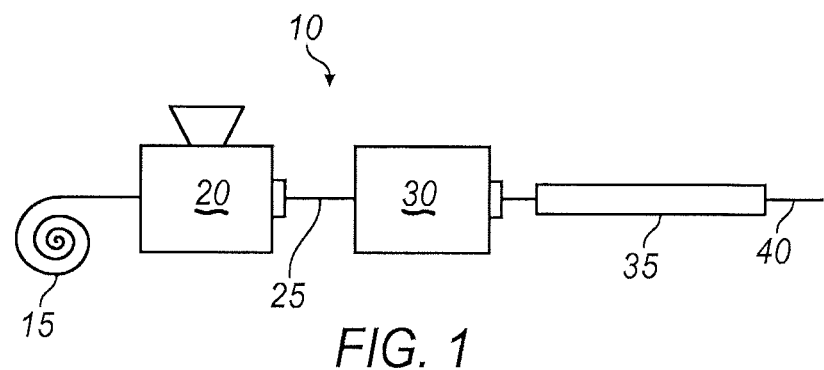
FIG. 1 illustrates an exemplary method of manufacturing wire.

Referring to FIG. 1, an exemplary method 10 for manufacturing wire is depicted. Generally, a conductive core 15 is fed into an extruder 20. Monomers, oligomers, polymers and other starting materials to form a cross-linkable polymer or polymers for an insulative layer or layers are added to the extruder 20. No curing agent is added to the extruder 20. The extruder 20 then extrudes the starting materials to create at least one insulative layer about the conductive core 15. The term "about" as used herein means circumferentially enveloping, but not necessarily in direct contact. The extruder 20 generates an extruded wire pre-product 25 that is substantially free of curing agent. The extruded wire pre-product 25 is then run through a bath 30 that comprises curing agent so that curing agent may be soaked into at least a portion of at least one insulative layer of the extruded wire pre-product 25. After the curing agent is added to the extruded wire pre-product 25, heat curing occurs at heat-curing station 35. Unexpectedly, the resultant heat-cured wire 40 has properties thought to be achievable only through e-beam manufacturing methods.

The exemplary method depicted in FIG. 1 is not generally limited by the materials selected for use as conductive cores 15, cross-linkable polymers, or by other optional materials includable in the extruder 20.

Conductive Cores

"Conductive core", as used herein, refers to at least one material such as a metal or a metalloid having conductive or semi-conductive properties for use in a wire. A wide range of conductive cores 15 may be suitable for use with the methods and wires disclosed herein. That is, the conductive core 15 may have a range of chemical compositions, so long as the conductive core 15 conducts electricity sufficiently for the application. Suitable conductive cores 15, for example, may include a metal comprising at least one of copper, nickel silver, beryllium, phosphor bronze, nickel, aluminum, or steel. Additionally, metals may be plated with another metal-containing material. For example, tin-plating, silver-plating, gold-plating, or nickel-plating may be suitable for use with the methods and wires disclosed herein. Exemplary conductive materials may also include copper-clad aluminum and copper-clad steel.

In applications where the conductive core 15 is semi-conductive, conductive core 15 may include a range of suitable semi-conductive materials. Such materials may include, with out limitation, silicon, graphite, germanium, antimony and gallium arsenide phosphide.

Conductive cores 15 may be configured in any of a wide range of arrangements. For example, the conductive core 15 may be solid (i.e., comprise a single strand of metal), or the conductive core 15 may be stranded. When the conductive core 15 is stranded, any number of strands may be used. For example, the number of strands can equal or exceed 6, 19, 37, 50, 154, 494, 741 or 1140 strands. The strands may all be of the same chemical composition, or different strands may have different chemical compositions. A wide range of configurations of strands may be suitable for the use with the methods and wires disclosed herein. For example, the strands say be woven or non-woven. Additionally, the conductive core 15 may comprise layers of strands upon one another. The configuration of adjacent layers of strands can be the same as or different from one another, whether woven or non-woven.

The conductive core 15 may have a cross-sectional area of a wide range of sizes. For example, cross-sectional areas of conductive core 15 may be as small as about 0.13, 0.22, or 0.35 mm$^2$. Additionally, cross-sectional areas of conductive core 15 may be as large as or larger than about 1, 2, 3, 4, 5 or 6 mm$^2$.

The conductive core 15 may have any set of properties desired for a particular application. For example, with respect to electrical properties, the conductive resistance of a conductive core 15 can be as low as about 0.1 mOhm/m at 20° C. or as high as about 130 mOhm/m at 20° C. In other words, properties such as electrical properties of conductive cores 15 do not limit the methods and wires disclosed herein.

Cross-Linkable Polymers

"Cross-linkable polymers", as used herein, refers to polymers having a chemical structure such that the polymers are capable of cross-linking upon curing, the polymers being substantially free of curing agent. "Substantially free", as used herein, encompasses the complete absence of curing agents, but also allows for incidental and/or trace amounts of curing agents to be detectable in the polymer using standard chemical analytical methods. Such incidental and/or trace amounts of curing agents should not comprise more than about 0.2% or more than about 1% by weight of the receptor polymer.

A wide range cross-linkable polymer or polymers may be suitable for use with the methods and wires disclosed herein. Thus, suitable cross-linkable polymers may include one or more of substituted or unsubstituted cross-linkable polyolefins such as polyethylene (including by way of non-limiting example, one or more of ultra high molecular weight polyethylene (UHMWPE), high density polyethylene (HDPE), linear low density polyethylene (LLDPE) and low density polyethylene (LDPE)). Suitable cross-linkable polymers may also include ethylene-propylene copolymers (EPM), ethylene-propylene-diene (EPDM) elastomers, polyvinyl chloride (PVC), ethylene vinyl acetate (EVA), and cross-linking fluoropolymers. Suitable commercially available cross-linkable polymers may include PETROTHENE® HDPE from Lyondell, MARLEX® HDPE from Chevron Phillips Chemical Co., TEFLON® and TEFZEL® fluoropolymers from Dupont, or KYNAR® and KYNAR FLEX® fluoropolymers from Arkema. Suitable commercially available cross-linkable polymers may also include ELVAX® EVA from Dupont, LEVAPRENE® EVM from LANXESS, PETROTHENE® LDPE from Lyondell, BOREALIS® LDPE from Borealis AG, ROYALENE® EPDM from Lion Copolymer, NEOPRENE® synthetic rubber from Dupont, NORDEL IP® hydrocarbon rubber from The Dow Chemical Co., ENGAGE® polyolefin from The Dow Chemical Co., TAFMER® alpha-olefin copolymer from Mitsui Chemical, and TYRIN® chlorinated polyethylene resin from The Dow Chemical Co.

One ore more cross-linkable polymers may be used in a single insulative layer or in multiple insulative layers. If multiple insulative layers are used, at least one such insulative layer must comprise a cross-linkable polymer. However, it is contemplated that one or more insulative layers may comprise non-cross-linkable polymers. If multiple insulative layers are used, the multiple insulative layers may be formed by a wide range of commercially reasonable manufacturing methods. For example, the multiple insulative layers may be co-extruded, extruded serially (sometimes referred to as tandem extrusion), or extruded separately and brought together manually at any time in the manufacturing method before the wires are tested and packaged.

Insulative layers formed from at least one cross-linkable polymer may have any dimensions, individually or collectively. For example, at least thick wall, thin wall, ultra thin wall, and ultra ultra thin wall wires may be manufactured according to the methods disclosed herein. Exemplary collective thicknesses of insulative layers on exemplary wires may range from about 0.16 mm to about 1.28 mm, and beyond.

Insulative layers may have a wide range of properties desired for a particular application. For example, with respect to electrical properties, a dielectric constant for an insulative layer may be as lower as or lower than about 1.2, and the dielectric constant may be as high as or higher than about 7.

Insulative layers other than the layers comprising cross-linking polymer may comprise a broad range of materials. For example, it is contemplated that tapes, separators, foils, shields and braids made from a broad cross-section of materials may be included as insulative layers.

Optional Materials

Except for the issues specific to curing agents as described herein, a wide range of additional ingredients may be placed in the extruder 20 to be extruded with the cross-linkable polymer or polymers and other starting materials. Such ingredients may include, by way of non-limiting example, monomers, oligomers or polymers to form one or more thermoplastic polymer insulative layers, fire retardants, processing aids, antioxidants, thermal stabilizers, elastomers, reinforcing fillers, antiozonants, accelerants, vulcanization agents, crack inhibitors, metal oxides and pigments.

Curing Agents

Referring to FIG. 1, following extrusion, curing agents are added to the extruded wire pre-product 25. A wide range of curing agents may be used in connection with the methods and wire disclosed herein. For example, curing agents may include one or more peroxides. Exemplary peroxides may include diacyl peroxide, dalkyl peroxide, hydroperoxides, ketone peroxide, organic peroxide, peroxy(di)carbonate, peroxyester, and peroxyketal. Curing agents may also include, sulfur, amines, and diamines, or any combination thereof. Suitable commercially available curing agents may include DI-CUP®, LUPEROX LP®, LUPEROX 101®, LUPEROX 224®, VUL-CUP R® and VUL-CUP 40KE® peroxides from Arkema, VAROX DCP®, VAROX VC-R®, VAROX DBPH® peroxides from Vanderbilt Co. Inc.

Coagents may optionally be included with one or more curing agents. Any suitable coagent may be used. Coagents may include, for example, one or more of di- or tri-functional acrylate or methacrylate, vinyl butadiene, vinyl butadiene-styrene copolymers. Coagents may optionally be included with the starting materials in the extruder 20.

The amount of curing agent used should be enough to cause sufficient cross-linking of the cross-linkable polymer or polymers to confer the desired properties onto the insulation of wire 40. Too little curing agent may lead to insufficient cross-linking, thereby generating wires that fail to satisfy technical specifications. Exemplary problems associated with insufficient curing or cross-linking may include swelling or cracking of wire insulation during manufacture or use.

By way of non-limiting example, for wires to be used in the automotive industry, too little curing agent may cause a wire 40 to fail one or more of the tests set forth in International Organization for Standardization (ISO) 6722 for road vehicles 60V and 600V single-core cables, which is incorporated by reference herein in its entirety. Among other tests, the ISO standards delineate a pressure test at high temperature, abrasion tests, heat aging tests, and tests for resistance to chemicals.

For the pressure test described in Section 7.1 of ISO 6722, wire samples are subjected to a load that is calculated as a function of the cross-sectional area of the conductive core of the wire (the outside diameter of the wire less the nominal thickness of the insulation in the wire), and heated for 4 hours in an oven. The temperature of the oven depends on the class of the wire being tested. For example, Class A rated wire would be heated to $85\pm2°$ C., whereas Class B rated wire would be heated to $100\pm2°$ C. The wire samples are then immersed in a salt water bath for 10 seconds, then subjected to 1 kV for 1 minute. If breakdown of the wire samples does not occur, then the wire samples pass the test.

There are two exemplary resistance-to-abrasion tests delineated in ISO 6722, a needle test (Section 9.3) and a sandpaper test (Section 9.2). For the needle test, a needle having a diameter of about $0.45\pm0.01$ mm may be selected to make abrasions of about $15.5\pm0.1$ mm in length at a frequency of about $55\pm5$ cycles per minute. An applied force of $7N\pm0.mm^2$ is exerted upon the sample wires. Suppliers and OEMs supplement the ISO standard by agreeing how many cycles of abrasion scrapes a wire having a conductive core of a particular cross-sectional area must endure while the insulation of the wire remains intact. For example, OEMs may require a supplier to manufacture a wire having a conductive core with a cross-sectional area of 1.5 $mm^2$ or greater, and require that the insulation of such a wire remain intact following at least 1500 cycles of abrasions. Similarly, OEMs may require a supplier to manufacture a wire having a conductive core with a cross-sectional area of about 0.22 $mm^2$ or less, and require that the insulation of such a wire remain intact following at least 150 cycles of abrasion scrapes. Other specifications are contemplated, such as wires having a conductive core with a cross-sectional area of about 0.35 $mm^2$ or about 0.5 $mm^2$, which are common wire sizes. For such wires, technical specifications may require insulation to withstand at least 200 or 300 cycles of abrasion scrapes, respectively.

For the ISO 6722 sandpaper test, 150J garnet sandpaper is applied to sample wires at a rate of $100\pm75$ mm/min with an applied force of at least 0.63N. Depending upon the cross-sectional area of the conductive core, an additional mass of a pre-selected magnitude is added to the apparatus to apply additional force on the sample wires. The sandpaper is drawn across the wire until at least some of the conductive core is exposed. The length of the sandpaper required to expose the conductive core is recorded as the measure of resistance to sandpaper abrasion. The ISO 6722 standard increases the length of sandpaper required to pass the test with the cross-sectional area of the conductive core of the sample wires. For example, a 60V thin wall wire for smaller gauge wires would require testing with an additional mass of 100 g, and the length of the sandpaper making the abrasion on the sample wire without exposing the conductive core would be 200 mm in length for a conductive core having a cross-sectional area of 0.13 mm$^2$, 224 mm in length for a conductive core having a cross-sectional area of 0.22 mm$^2$, and 250 mm in length for a conductive core having a cross-sectional area of 0.35 mm$^2$. By comparison, a 60V thin wall wire for larger gauge wires would require testing with an additional mass of 200 g, and the length of sandpaper making the abrasion on the sample wire without exposing the conductive core would be 300 mm in length for a conductive core having a cross-sectional area of 0.5 mm$^2$, 450 mm in length for a conductive core having a cross-sectional area of 1.5 mm$^2$, and 500 mm in length for a conductive core having a cross-sectional area of 2.0 mm$^2$.

Heat aging tests are described in Section 10 of ISO 6722. For example, for long term aging, sample wires are placed in an oven for 3000 hours. The temperature depends upon the class rating of the sample wires. For example, class C wire is heated at 125±2° C. and class D wire is heated at 150±2° C. This simulates aging. After simulated aging, the sample wires are cooled at room temperature for at least about 16 hours, then the wires are wound into a winding. If any of the conductive core is exposed in the winding (that is, if the insulation cracks), then the sample wire fails the test. If not, the sample wire is immersed in a salt water bath for 10 minutes, then subjected to 1 kV for 1 minute. If breakdown of the sample wires does not occur, then the sample wires pass the test.

Resistance-to-chemicals tests are described in Section 11 of ISO 6722. For example, for resistance to hot water, closely wound sample wires of a specified length are immersed in a salt water bath at 185±5° C. for 7 days, which completes one cycle. After five cycles, the sample wires are cooled, visually inspected, then subjected to 1 kV for 1 minute. If there is no cracking on the insulation, the sample wires pass the visual inspection. If breakdown of the sample wires does not occur, then the sample wires pass the test.

Unexpectedly, wires 40 manufactured by the methods disclosed herein passed the battery of tests disclosed in ISO 6722 with cross-linked insulation of the wires 40 having a state of cure as low as 50%. Generally, to pass a battery of tests such as those described above and detailed in ISO 6722, sufficient curing agent should be associated with the cross-linkable polymer or polymers to ensure a state of cure of at least about 50% the insulative cross-linkable polymers in the wire 40. There may be instances where technical specifications can be satisfied with an even lower state of cure. Additionally, there may be instances where a state of cure of at least about 75% is desired to satisfy particular technical specifications. On the low end, curing agents may comprise about 0.25% by weight of the cross-linkable polymer or polymers in the wire 40, but weight percentages may be about 0.5%, about 1.0%, 2.0% or about 3.5% of the total cross-linkable starting materials. Depending upon the particular application for the wire 40 and technical specifications placed upon the wire 40 to be manufactured, less or more curing agent may be added than the specific ranges exemplified herein.

Manufacturing Methods

The exemplary method depicted in FIG. 1 is not generally limited by the type of extruder 20 that is used. Indeed, any extruder 20 capable of extruding at least one cross-linkable polymer about at least one conductive core 15 may be used in connection with the wires and methods disclosed herein. Extruder 20 may be adapted to receive at least one conductive core 15 from a wide range of feed sources. Extruder 20 may include a hopper to add one or more materials to create, at least, an insulative layer comprising an extruded cross-linkable polymer about the conductive core 15. New and used exemplary extruders 20 are commercially available from many sources, including but not limited to Davis Standard or Progressive Machinery, Inc.

Because curing agents are not added to the extruder 20, extrusion temperatures are not limited to those below a cure temperature for a particular cross-linkable polymer and curing agent combination. "Extrusion temperature", as used herein, refers to the temperature at which resins in the extruder 20 exit the extruder 20 through a nozzle. Extrusion temperatures below cure temperatures may still be used, but higher extrusion temperatures may be useful for, for example, increasing manufacturing line speeds. By way of non-limiting example, extrusion temperatures can be as high or higher than about 125° C., about 200° C., or about 300° C.

Figure 2:
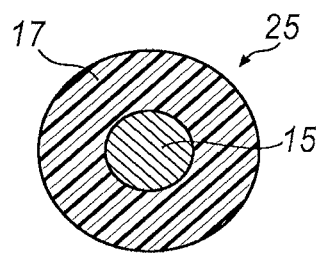
FIG. 2 shows a cross-section of an exemplary extruded wire pre-product.
Figure 3:
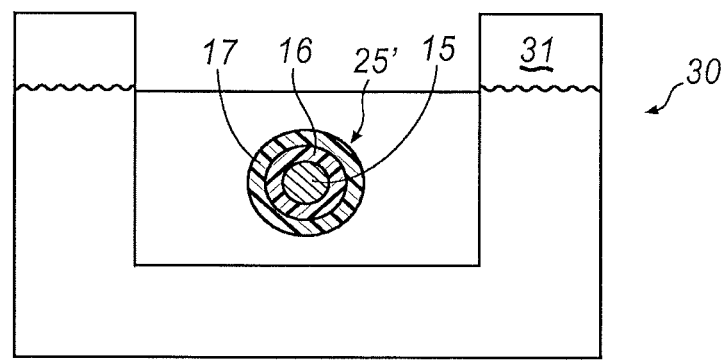
FIG. 3 shows a cross-section of an exemplary extruded wire pre-product in a bath of curing agent.

Referring to FIG. 1, the extruder 20 extrudes one or more cross-linkable polymers about a conductive core 15, outputting an extruded wire pre-product 25 that is substantially free of curing agents. Referring to FIG. 2, an exemplary extruded wire pre-product 25 is shown. In FIG. 2, a single layer of a cross-linkable polymer 17 is extruded about, and in direct contact with, conductive core 15. It is contemplated that additional insulative layers may be included with in extruded wire pre-product 25. For example, in FIG. 3, a cross-section of another exemplary extruded wire pre-product 25' is shown. In the example of FIG. 3, the extruded wire pre-product 25' has a conductive core 15 in direct contact with an insulative layer 16, which is in contact with another insulative layer 17. At least insulative layer 17 comprises one or more extruded cross-linkable polymers. Insulative layer 16 may comprise one or more extruded cross-linkable polymers, but may also comprise thermoplastic polymers that will not cross-link or other insulative materials.

After extrusion of the extruded wire pre-product 25, one or more curing agents must be added to the extruded wire pre-product 25. One exemplary way of adding the curing agent to the extruded wire pre-product 25 is to pull the extruded wire pre-product 25 through a bath 30 comprising a liquid curing agent. Referring to FIG. 3, a bath 30 comprising a curing agent is shown with the extruded wire pre-product 25' therein.

The bath 30 may include pure or diluted curing agents and may include coagents. The temperature of the bath 30 should be high enough to make the curing agent liquid so that the extruded wire pre-product 25 may be pulled therethrough. The temperature of the bath 30 can be elevated higher to increase the speed at which the curing agent is soaked or absorbed into at least one cross-linkable polymer-containing insulative layer of the extruded wire pre-product 25. Such an increase in temperature may increase manufacturing line speeds.

The temperature of the bath may be managed using a wide range of methods. An exemplary method involves immersing the bath 30 in a secondary bath 31 of another material such as water. The temperature of the bath 30 and the secondary bath 31 may range on the low end from about 40° C., 50° C., or 55° C., and may range on the higher end of about 70° C., 80° C. or 95° C. when water is the secondary material. Different materials used for curing agents and/or cross-linkable polymers may require temperatures to be lower than or higher than the specific exemplified ranges. Other exemplary methods of managing temperature include the use of heated surfaces and heating lamps.

The duration of time that the extruded wire pre-product 25 is pulled through the bath 30 depends upon the materials used and the technical specifications placed upon the resultant wire 40. The duration time and the temperature of the bath should be sufficient for enough curing agent to be soaked into at least a portion of a cross-linkable polymer-containing insulative layer of the extruded wire pre-product 25 to confer the desired technical properties on the insulation of the resultant wire 40 following heat curing. If the bath 30 temperature is relatively high, then the time required for sufficient curing agent to soak into the extruded wire pre-product 25 will be relatively shorter. If the bath 30 temperature is relatively low, then the time required for sufficient curing agent to soak into the extruded wire pre-product 25 will be relatively longer.

Additional methods of adding curing agent to extruded wire pre-product 25 are contemplated. For example, curing agent may be sprayed onto extruded wire pre-product 25 at a temperature and for a time sufficient for enough curing agent to be soaked into at least a portion of a cross-linkable polymer-containing insulative layer of the extruded wire pre-product 25 to confer the desired technical properties on the insulation of the resultant wire 40 following heat curing.

After the extruded wire pre-product 25 has curing agent added thereto, heat curing may occur at heat curing station 35. A wide range of equipment and methods of heat curing may be used. Such equipment may include Davis Standard steam tube cure equipment. Although the described sources of heat thus far include external application of heat, internal sources of heat are also contemplated. Internal sources of heat may include, for example, an exothermic reaction in the materials used to form the resultant wire 40.

The time and temperature of heat curing should be sufficient to cause enough cross-linking for the insulation of the resultant wire 40 to satisfy technical specifications. For many technical specifications, a 50% state of cure is sufficient. Faster manufacturing line speeds are generally more desirable than slower manufacturing line speeds. Typical cure durations may range anywhere from about 30 seconds to about 2 minutes to about 5 minutes to about 10 minutes. Using the methods disclosed herein, cure temperatures may be as low as extrusion temperatures, and may be as high as necessary to achieve sufficient cross-linking, as described above. Typical cure temperatures may be as low as about 130° C. or about 140° C., and may be as high as about 170° C., about 180° C. or about 200° C. The use of different materials and the demands of different technical specifications may cause cure times and cure temperatures to be higher than or lower than the specific ranges disclosed herein.

Any commercially reasonable manufacturing line speed can be selected for use herein. Typical line speeds may be from about 300 m/min to about 1250 m/min. Unexpectedly, when manufacturing line speeds were has high as about 900 m/min or higher, and the degree of cross-linking in the insulative layer was less than 75%, the resultant wires 40 made by the methods disclosed herein were exceptionally resistant to scrape abrasion and passed the tests set forth in ISO 6722 set forth above.

EXAMPLE 1

Figure 4:
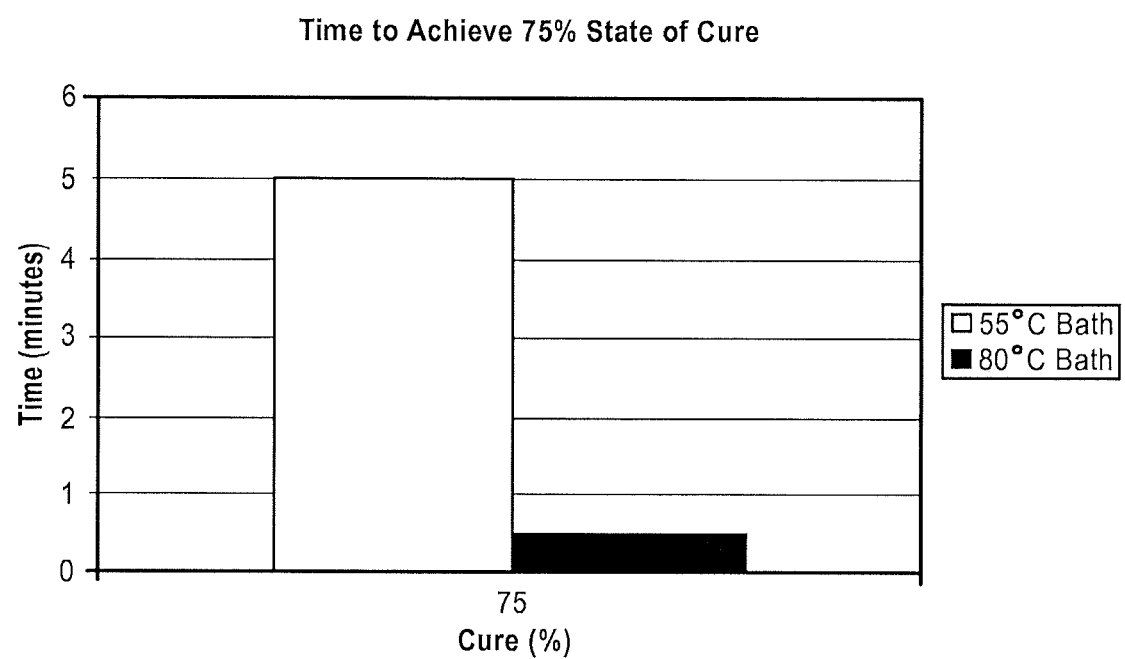
FIG. 4 graphically relates time and temperature conditions of adding a curing agent to an exemplary extruded wire pre-product to a state of cure of cross-linked insulation.

Copper wire was fed to a Brabender extruder, and PETROTHENE® HDPE was added to the hopper. The polymer resin was extruded about the wire at 190±5° C. for 30 minutes. A first series of samples were run through an un-diluted liquid VULCUP R® peroxide bath maintained at 55±5° C. for various time intervals. A second series of samples were run through an un-diluted liquid VULCUP R® peroxide bath maintained at 80±5° C. for various time intervals. The wire pre-products were then steam cured at 200±5° C. for 10 minutes. The samples for the first series and the second series were tested to determine state of cure using ASTM D2765 solvent extraction. Unexpectedly, on all samples in the first series, a soak time in the peroxide bath of about five minutes produced resultant wires having a 75% state of cure. In the first series, sample 1-1 emerged from a bath of 56° C. and achieved an 80.7% state of cure. Sample 1-2 emerged from a bath of 55° C. and achieved a 79.9% state of cure. Sample 1-3 emerged from a bath of 53° C. and achieved an 85.5% state of cure. Unexpectedly, on all samples in the second series, a soak time in the peroxide bath of less than one minute produced resultant wires having a 75% state of cure. In the first series, sample 2-1 emerged from a bath of 78° C. and achieved a 77.0% state of cure. Sample 2-2 emerged from a bath of 78° C. and achieved a 87.2% state of cure. Sample 2-3 emerged from a bath of 78° C. and achieved an 88.7% state of cure. The results are graphically depicted in FIG. 4.

EXAMPLE 2

Copper wire was fed to a Brabender extruder, and DOW ENGAGE® Polyolefin Elastomer was added to the hopper. The polymer resin was extruded about the wire at 130±5° C. for 30 minutes. A first series of samples were run through an un-diluted liquid VULCUP R® peroxide bath maintained at 55±5° C. for various time intervals. A second series of samples were run through an un-diluted liquid VULCUP R® peroxide bath maintained at 80±5° C. for various time intervals. The wire pre-products were then steam cured at 200±5° C. for 10 minutes. The samples for the first series and the second series were tested to determine state of cure using ASTM D2765 solvent extraction. Unexpectedly, on all samples in the first series, a soak time in the peroxide bath of about five minutes produced resultant wires having a 75% state of cure. In the first series, sample 1-1 emerged from a bath of 56° C. and achieved an 75.6% state of cure. Sample 1-2 emerged from a bath of 55° C. and achieved a 78.7% state of cure. Sample 1-3 emerged from a bath of 55° C. and achieved a 78.6% state of cure. Unexpectedly, on all samples in the second series, a soak time in the peroxide bath of less than one minute produced resultant wires having a 75% state of cure. In the first series, sample 2-1 emerged from a bath of 78° C. and achieved a 81.3% state of cure. Sample 2-2 emerged from a bath of 78° C. and achieved a 79.9% state of cure. Sample 2-3 emerged from a bath of 79° C. and achieved a 79.6% state of cure. Sample 2-4 emerged from a bath of 80° C. and achieved a 79.3% state of cure.

EXAMPLE 3

Copper wire was fed to a Brabender extruder, and PETROTHENE® HDPE was added to the hopper. The wire feed had a cross sectional area of about 0.5 mm². The polymer resin was extruded about the wire at 190±5° C. for 30 minutes and run through an un-diluted liquid VULCUP R® peroxide bath maintained at 80±5° C. for 1 minute. The wire pre-products were then steam cured at 200±5° C. for time intervals ranging from minute to 30 minutes. Each of the samples was tested for scrape abrasion with a needle having a diameter of 0.45±0.01 mm. Unexpectedly, on all samples, the cured polymer resin remained intact after more than 300 cycles of abrasion scrapes.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of manufacturing a wire, comprising:
    extruding a cross-linkable polymer, substantially free of curing agent, about a conductive core to form an extruded wire pre-product;
    adding a curing agent to the extruded wire pre-product, wherein adding the curing agent comprises soaking the extruded wire pre-product in a liquid bath containing curing agent for a time and at a temperature sufficient for curing agent to disperse into at least a portion of the cross-linkable polymer, wherein the time sufficient for soaking is from about 20 seconds to about five minutes, and wherein the curing agent comprises a peroxide; and
    heat curing the extruded wire pre-product with the curing agent, wherein a state of cure of at least about 50% is achieved and wherein a cure duration is from about 30 seconds to 30 minutes.

2. The method of claim 1, wherein the conductive core comprises at least one of solid or stranded copper, nickel silver, beryllium, phosphor bronze, nickel, copper-clad aluminum, copper-clad steel, aluminum and steel.

3. The method of claim 1, wherein the conductive core comprises a semi-conductive material.

4. The method of claim 1, wherein extruding the cross-linkable polymer comprises disposing the cross-linkable polymer in direct contact with the conductive core.

5. The method of claim 1, wherein extruding the cross-linkable polymer comprises heating the cross-linkable polymer to a temperature of at least about 125° C.

6. The method of claim 1, wherein the temperature of the liquid bath is at least about 40° C.

7. The method of claim 1, wherein the conductive core has a cross-sectional area of at least about 1.5 mm² and wherein heat curing comprises subjecting the extruded wire pre-product to a heightened temperature for time sufficient to form a wire including insulation capable of remaining intact following at least 1500 cycles of abrasion scrapes with a needle having a diameter of about 0.45±0.1mm.

8. The method of claim 1, wherein the conductive core has a cross-sectional area of not greater than 0.22 mm² and wherein heat curing comprises subjecting the extruded wire pre-product to a heightened temperature for time sufficient to form a wire including insulation capable of remaining intact following at least 150 cycles of abrasion scrapes with a needle having a diameter of about 0.45±0.01 mm.

9. The method of claim 8, wherein the heightened temperature is at least about 125° C. and the time sufficient for curing is at least about 30 seconds.

10. The method of claim 1, wherein the conductive core has a cross-sectional area of 0.35 mm² and wherein heat curing comprises subjecting the extruded wire pre-product to a heightened temperature for time sufficient to form a wire including insulation capable of remaining intact following an abrasion scrape with a 150 J garnet sandpaper with a length of about 250 mm that is exerted with an applied force of at least about 0.63N.

11. The method of claim 1, wherein the time sufficient for soaking is from about 20 seconds to about one minute, the temperature of the liquid bath is about 80±5° C., and the state of cure achieved is at least about 75%.

12. The method of claim 1, wherein the cure duration is from about 30 seconds to about 10 minutes.

* * * * *